(12) United States Patent
Onoma

(10) Patent No.: US 12,276,384 B2
(45) Date of Patent: Apr. 15, 2025

(54) VEHICLE LIGHTING APPLIANCE LENS, VEHICLE LIGHTING APPLIANCE UNIT, AND VEHICLE LIGHTING APPLIANCE DEVICE

(71) Applicant: Ichikoh Industries, Ltd., Isehara (JP)

(72) Inventor: Kei Onoma, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/568,960

(22) PCT Filed: Jun. 8, 2022

(86) PCT No.: PCT/JP2022/023164
§ 371 (c)(1),
(2) Date: Dec. 11, 2023

(87) PCT Pub. No.: WO2022/260095
PCT Pub. Date: Dec. 15, 2022

(65) Prior Publication Data
US 2024/0280232 A1  Aug. 22, 2024

(30) Foreign Application Priority Data

Jun. 11, 2021 (JP) ................................ 2021-098331

(51) Int. Cl.
*F21S 41/265* (2018.01)
*F21S 41/147* (2018.01)
(Continued)

(52) U.S. Cl.
CPC ........... *F21S 41/265* (2018.01); *F21S 41/147* (2018.01); *F21S 41/321* (2018.01); *F21W 2102/155* (2018.01)

(58) Field of Classification Search
CPC ...... F21S 41/265; F21S 41/147; F21S 41/321; F21W 2102/155
See application file for complete search history.

(56) References Cited

U.S. PATENT DOCUMENTS 10,563,832 B2   2/2020  Zhu et al.
2017/0343175 A1* 11/2017 Owada ................. F21S 41/365
(Continued)

FOREIGN PATENT DOCUMENTS

JP   2017-16784 A   1/2017
JP      6637187 B2   1/2020
(Continued)

OTHER PUBLICATIONS

International Search Report mailed on Aug. 16, 2022 in PCT/JP2022/023164 filed on Jun. 8, 2022 (2 pages).
(Continued)

*Primary Examiner* — Elmito Breval
(74) *Attorney, Agent, or Firm* — Oblon, McClelland, Maier & Neustadt, L.L.P.

(57) ABSTRACT

A vehicle lighting appliance lens, a vehicle lighting appliance unit, and a vehicle lighting appliance device each includes an incidence part, a second reflective surface, a cutoff-line forming part, and an emission surface. The cutoff-line forming part is provided in the left-right direction of a vehicle. As a result, the flowability of resin is improved, the control of a low-beam light distribution pattern is improved, and a cutoff line without warping is formed.

9 Claims, 10 Drawing Sheets

(51) Int. Cl.
  *F21S 41/32*   (2018.01)
  *F21W 102/155*   (2018.01)

(56) References Cited

U.S. PATENT DOCUMENTS

| | | | |
|---|---|---|---|
| 2018/0058651 A1* | 3/2018 | Gromfeld | F21S 41/25 |
| 2020/0141550 A1* | 5/2020 | Zhu | G02B 19/0066 |

FOREIGN PATENT DOCUMENTS

| | | | |
|---|---|---|---|
| JP | 2020-35702 A | 3/2020 | |
| JP | 2020-191204 A | 11/2020 | |
| JP | 2021-86724 A | 6/2021 | |

OTHER PUBLICATIONS

Office Action issued Jul. 23, 2024, in corresponding Japanese Patent Application No. 2021-098331, 10 pages.

* cited by examiner (A)

(B)

(C)

(A)

(B)

VEHICLE LIGHTING APPLIANCE LENS, VEHICLE LIGHTING APPLIANCE UNIT, AND VEHICLE LIGHTING APPLIANCE DEVICE

TECHNICAL FIELD

The present invention relates to a vehicle lighting appliance lens. The present invention relates to a vehicle lighting appliance unit. The present invention further relates to a vehicle lighting appliance device.

BACKGROUND ART

Examples of light distribution patterns having a cutoff line along the left-right direction of a vehicle, i.e., vehicle lighting appliance lenses, vehicle lighting appliance units, vehicle lighting appliance devices that emit a low-beam light distribution pattern are described in PTL 1 and 2. PTL 1 and 2 are described below.

A condenser used in a low-beam headlight module of PTL 1 (hereinafter referred to as a "condenser") includes a condensing structure and a cutoff-line forming structure. The condensing structure is provided on the LED light source side at the rear end of the condenser. The cutoff-line forming structure is provided at the front end of the condenser, i.e., the end adjacent to the lens. A contour curve of an end surface of the cutoff-line forming structure adjacent to the lens has an arc shape. The condenser of PTL 1 emits a low-beam light distribution pattern having a cutoff line along the left-right direction of a vehicle.

A vehicle light guide and a vehicle lighting appliance unit of PTL 2 include an incidence surface, a first reflective surface, a second reflective surface, a light shielding part, and an emission surface. The second reflective surface is based on a paraboloid of revolution and has a focal point located in the vicinity of the focal point of the emission surface. The light shielding part passes through the focal point and linearly extends in the left-right direction. In the vehicle light guide and the vehicle lighting appliance unit of PTL 2, light from a light source enters from the incidence surface as incident light. The incident light is internally reflected as parallel light by the first reflective surface. The parallel light is reflected by the second reflective surface toward the focal point as reflected light. A portion of the reflected light is shielded by the light shielding part, and the rest of the reflected light passes through the light shielding part. The passing light that passes through the light shielding part is emitted from the emission surface toward the front of the vehicle in a headlight pattern (a low-beam light distribution pattern having a cutoff line along the left-right direction of the vehicle).

CITATION LIST

Patent Literature

PTL 1: Japanese Patent No. 6637187
PTL 2: Japanese Patent Laid-open No. 2020-191204

SUMMARY OF THE INVENTION

Problems to be Solved by the Invention

However, in the condenser of PTL 1, the contour curve of the end surface of the cutoff-line forming structure adjacent to the lens has an arc shape. As a result, in the condenser of PTL 1, smooth flow of resin cannot be obtained at the end face of the cutoff-line forming structure adjacent to the lens at the time of resin molding, and there is a problem in resin flowability.

On the other hand, in the vehicle light guide and the vehicle lighting appliance unit of PTL 2, the light shielding part is formed in a shape linearly extending in the left-right direction, that is, a simplified shape. As a result, in the vehicle light guide and the vehicle lighting appliance unit of PTL 2, a smooth flow of the resin is obtained in the light shielding part at the time of resin molding, and the flowability of the resin is improved. In addition, in the vehicle light guide and the vehicle lighting appliance unit of PTL 2, since the light shielding part is formed in a simplified shape extending linearly in the left-right direction, the control of the low-beam light distribution pattern is easily performed and improved.

However, in the vehicle light guide and the vehicle lighting appliance unit of PTL 2, since the light shielding part is formed in a shape linearly extending in the left-right direction, the shape of the cutoff line of the low-beam light distribution pattern may warp upward as it shifts from the middle to the left and right. For example, as illustrated in FIG. 11(B), the shape of the cutoff lines CLD1 and CLU1 of the low-beam light distribution pattern LP1 projected on a screen warp upward relative to the horizontal cutoff lines CLD and CLU (see the broken lines in FIG. 11(B)) as the cutoff lines CLD1 and CLU1 shift from the center (top-bottom vertical line VU-VD of the screen) to the left and right. When the warpage is large, there is a possibility that the regulation is not satisfied. For this reason, it is necessary to form the cutoff lines of the low-beam light distribution pattern without warping. The warping increases greatly from the center of the cutoff lines CLD1 and CLU1 toward the left and right.

An object of the present invention is to provide a vehicle lighting appliance lens, a vehicle lighting appliance unit, and a vehicle lighting appliance device that are capable of improving the flowability of resin, improving control of a low-beam light distribution pattern, and forming cutoff lines without warping.

Means for Solving the Problem

A vehicle lighting appliance lens according to an aspect of the present invention includes an incidence part on which at least a portion of light from a light source is incident: a reflective surface that has a reflective-surface focal point and reflects incident light from the incidence part; a cutoff-line forming part that is disposed in a left-right direction of a vehicle and forms a cutoff line by controlling a portion of reflected light from the reflective surface; and an emission surface that emits the reflected light passing through the cutoff-line forming part in front of the vehicle as a light distribution pattern having the cutoff line, wherein, the reflective-surface focal point is disposed in a vicinity of the cutoff-line forming part, and the reflective surface has a first region in which the reflected light passes through the vicinity of the cutoff-line forming part; and a second region in which the reflected light passes through a position away from the cutoff-line forming part toward the reflective surface.

A vehicle lighting appliance lens according to an aspect of the present invention includes: an incidence part that has an incidence-part optical axis tilting relative to a vertical line, and cause at least a portion of light from a light source to be incident as parallel light parallel or substantially parallel to the incidence-part optical axis: a reflective surface that is based on a paraboloid of revolution, has a reflective-surface optical axis that is a rotation axis of the paraboloid of revolution, has a reflective-surface focal point that is a focal point of the paraboloid of revolution, and reflects incident light from the incidence part: a cutoff-line forming part that is disposed in a left-right direction of a vehicle and forms a cutoff line along the left-right direction of the vehicle by controlling a portion of reflected light from the reflective surface; and an emission surface that emits the reflected light passing through the cutoff-line forming part in front of the vehicle as a light distribution pattern having the cutoff line, wherein, the emission surface has an emission-surface focal point in a vicinity of the reflective-surface focal point, the reflective surface has a central reflective region and outer reflective regions, and the reflective-surface optical axis of the central reflective region tilts toward the vertical line as compared with the reflective-surface optical axes of the outer reflective regions.

In the vehicle lighting appliance lens according to an aspect of the present invention, the incidence-part optical axis tilts in a state where the direction of the incident light is directed to the emission surface side relative to the vertical line: as the reflective-surface optical axis of a left reflective region of the outer reflective regions shifts to a left side, the reflective-surface optical axis shifts from a state of being parallel or substantially parallel to the incidence-part optical axis to a state of being parallel or substantially parallel to the vertical line, and as the reflective-surface optical axis of a right reflective region of the outer reflective regions shifts to a right side, the reflective-surface optical axis shifts from a state of being parallel or substantially parallel to the incidence-part optical axis to a state of being parallel or substantially parallel to the vertical line.

In the vehicle lighting appliance lens according to an aspect of the present invention, it is preferred that the cutoff-line forming part includes a lower horizontal cutoff-line forming part and an upper horizontal cutoff-line forming part, one of the left reflective region and the right reflective region controls the reflected light passing through the lower horizontal cutoff-line forming part, the other of the left reflective region and the right reflective region controls the reflected light passing through the upper horizontal cutoff-line forming part, and the reflective-surface optical axis of the one of the left reflective region and the right reflective region is parallel or substantially parallel to the vertical line relative to the reflective-surface optical axis of the other of the left reflective region and the right reflective region.

A vehicle lighting appliance unit according to an aspect of the present invention includes a light source; and the vehicle lighting appliance lens according to an aspect of the present invention that receives light from the light source and emits incident light as a light distribution pattern having a cutoff line along a left-right direction of a vehicle.

In the vehicle lighting appliance unit according to an aspect of the present invention, it is preferred that the light source includes a plurality of light sources, and the vehicle lighting appliance lens includes a plurality of incidence parts corresponding to the plurality of light sources.

A vehicle lighting appliance device according to an aspect includes: a lamp lens and a lamp housing forming a lamp compartment; and the vehicle lighting appliance unit according to an aspect of the present invention disposed in the lamp compartment.

Effect of the Invention

A vehicle lighting appliance lens, a vehicle lighting appliance unit, and a vehicle lighting appliance device according to the present invention are capable of improving the flowability of resin, improving control of a low-beam light distribution pattern, and forming cutoff lines without warping.

BRIEF DESCRIPTION OF THE DRAWINGS

[FIG. 8(A)] FIG. 8(A) is a partial longitudinal cross-sectional view of optical paths in an incidence part and a reflective surface of a lens to which the present invention is not applied. [FIG. 8(B)] FIG. 8(B) is a partial longitudinal cross-sectional view of optical paths in an incidence part and a reflective surface of a lens to which the present invention is applied.

[FIG. 11(A)] FIG. 11(A) is an explanatory view of a low-beam light distribution pattern by a reflective surface formed of a basic paraboloid of revolution. [FIG. 11(B)] FIG. 11(B) is an explanatory view of a low-beam light distribution pattern by a reflective surface to which the present invention is not applied. [FIG. 11(C)] FIG. 11(C) is an explanatory view of a low-beam light distribution pattern by a reflective surface to which the present invention is applied.

FIG. 13(B) is a partially enlarged longitudinal cross-sectional view (a partially enlarged vertical cross-sectional view that is a cross-sectional view taken along the line XIII-XIII in FIG. 12) of optical paths of an incidence part of the lens of a modification.

MODE FOR CARRYING OUT THE INVENTION

Figure 1:
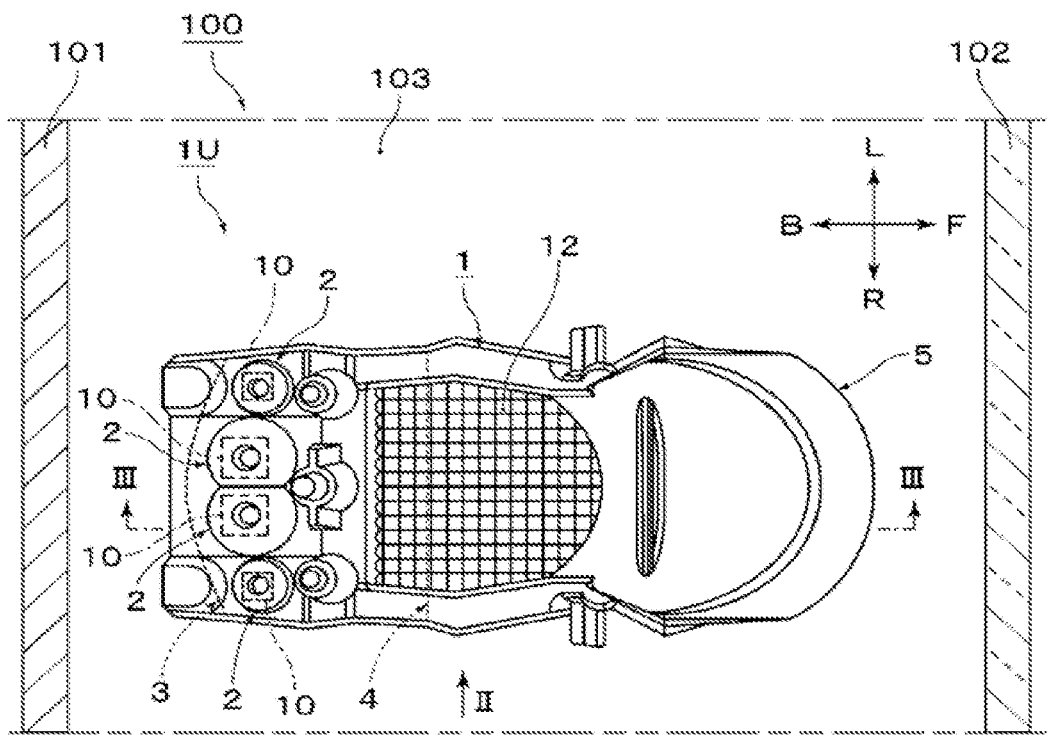
FIG. 1 is a plan view of a lens illustrating an embodiment of a lens of a vehicle lighting appliance lens, a vehicle lighting appliance unit, and a vehicle lighting appliance device according to the present invention.

In the following, embodiments (examples) of a vehicle lighting appliance lens, a vehicle lighting appliance unit, and a vehicle lighting appliance device according to the present invention are described in detail with reference to the drawings. The embodiments are applied to left-hand traffic in Japan, UK, etc.

In the specification and the attached claims, the front, rear, upper, lower, left, and right are respectively the front, rear, upper, lower, left, and right when the vehicle lighting appliance lens, the vehicle lighting appliance unit, and the vehicle lighting appliance device according to the present invention are installed on a vehicle. In the drawings, the reference symbols "F," "B," "U," "D," "L," and "R" denote "front," "back," "up," "down," "left," and "right," respectively.

Figure 10:
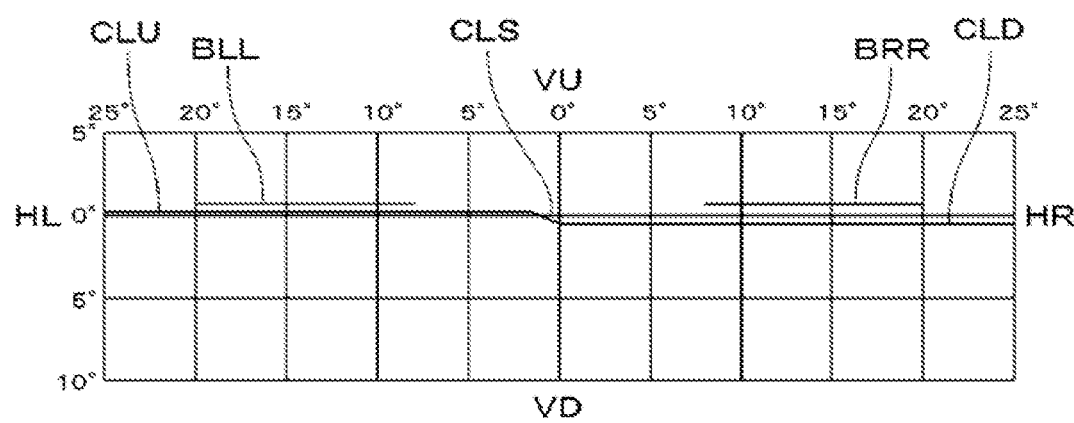
FIG. 10 is an explanatory view of luminous intensity of a point specified by regulations in a low-beam light distribution pattern.
Figure 11:
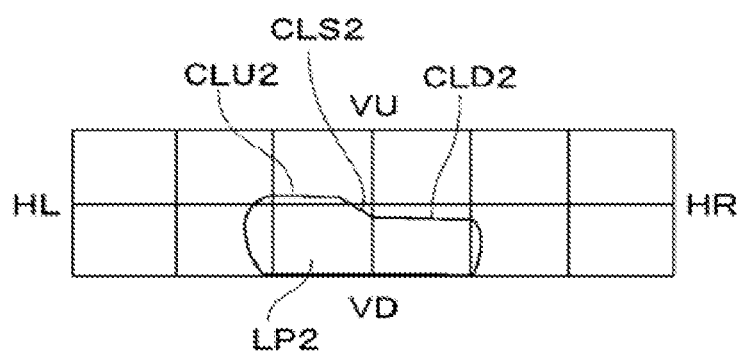
FIG. 11 is an explanatory view of a low-beam light distribution pattern.
Figure 11:
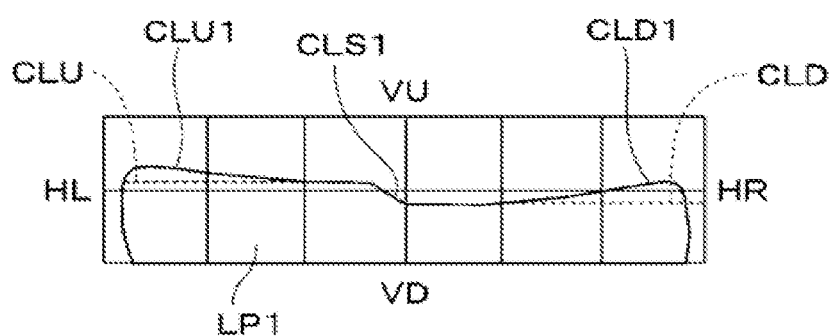
Figure 11:
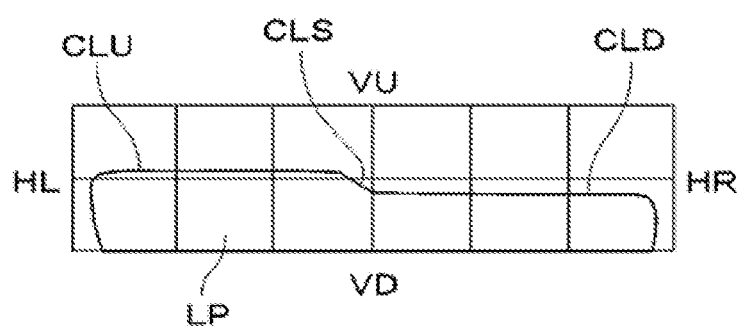

FIGS. 10 and 11 are explanatory diagrams illustrating a low-beam light distribution pattern emitted on a screen installed at a position 25 meters in front of a vehicle. In FIGS. 10 and 11, the reference symbol "VU-VD" denotes a top-bottom vertical line of the screen. The reference symbol "HL-HR" denotes a left-right horizontal lines of the screen.

Since the drawings are schematic diagrams illustrating the vehicle lighting appliance lens, the vehicle lighting appliance unit, and the vehicle lighting appliance device according to the present invention, main components of the vehicle lighting appliance lens, the vehicle lighting appliance unit, and the vehicle lighting appliance device according to the present invention are illustrated, and components other than the main components are not illustrated. Furthermore, hatching is omitted in FIGS. 3, 6, 8, 9, 12, and 13.

(Description of Configuration of Embodiments)

The configurations will now be described of a vehicle lighting appliance lens 1 (hereinafter, referred to as a "lens 1") according to the present embodiment, a vehicle lighting appliance unit 1U (hereinafter, referred to as a "vehicle lighting appliance unit 1U") according to the present embodiment, and a vehicle lighting appliance device 100 (hereinafter, referred to as a "vehicle lighting appliance device 100") according to the present embodiment.

(Description of Vehicle Lighting Appliance Device 100)

The vehicle lighting appliance device 100 is mounted on each of the left and right sides of a front portion of a vehicle (automobile) (not illustrated). In this example, the vehicle lighting appliance device 100 is a vehicular headlight (headlamp) that emits a low-beam light distribution pattern (see a condensing low-beam light distribution pattern LP illustrated in FIG. 11(C)) to the front of the vehicle.

FIG. 1 is a transverse cross-sectional view (horizontal cross-sectional view) of the vehicle lighting appliance device 100. As illustrated in FIG. 1, the vehicle lighting appliance device 100 includes a lamp housing 101, a lamp lens 102, and a vehicle lighting appliance unit 1U.

The lamp housing 101 is composed of a light-impermeable resin member. The lamp lens 102 is composed of a light-transmissive resin member or glass. The lamp lens 102 is an outer lens or an outer cover. The lamp lens 102 conforms to the design surface of the vehicle.

A lamp compartment 103 is formed by the lamp housing 101 and the lamp lens 102. The vehicle lighting appliance unit 1U, one or more vehicle lighting appliance units (not illustrated), an inner panel (not illustrated), and the like are disposed in the lamp compartment 103.

The vehicle lighting appliance device 100 can emit light distribution patterns other than a low-beam light distribution pattern, for example, a high-beam light distribution pattern, a light distribution pattern for a daytime running lamp, a light distribution pattern for a front turn signal lamp, and the like, by arranging other vehicle lighting appliance units.

(Description of Vehicle Lighting Appliance Unit 1U)

Figure 2:
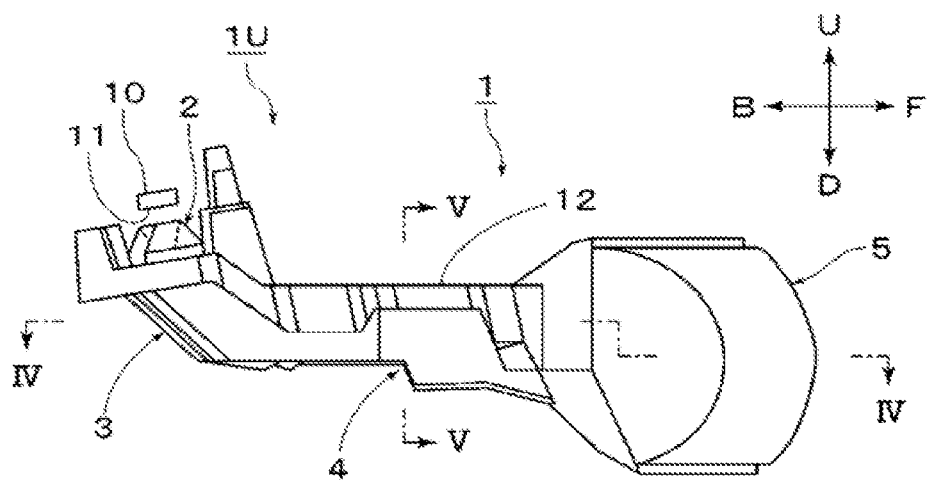
FIG. 2 is a side view of the lens and a light source (a view taken along arrow II in FIG. 1).
Figure 3:
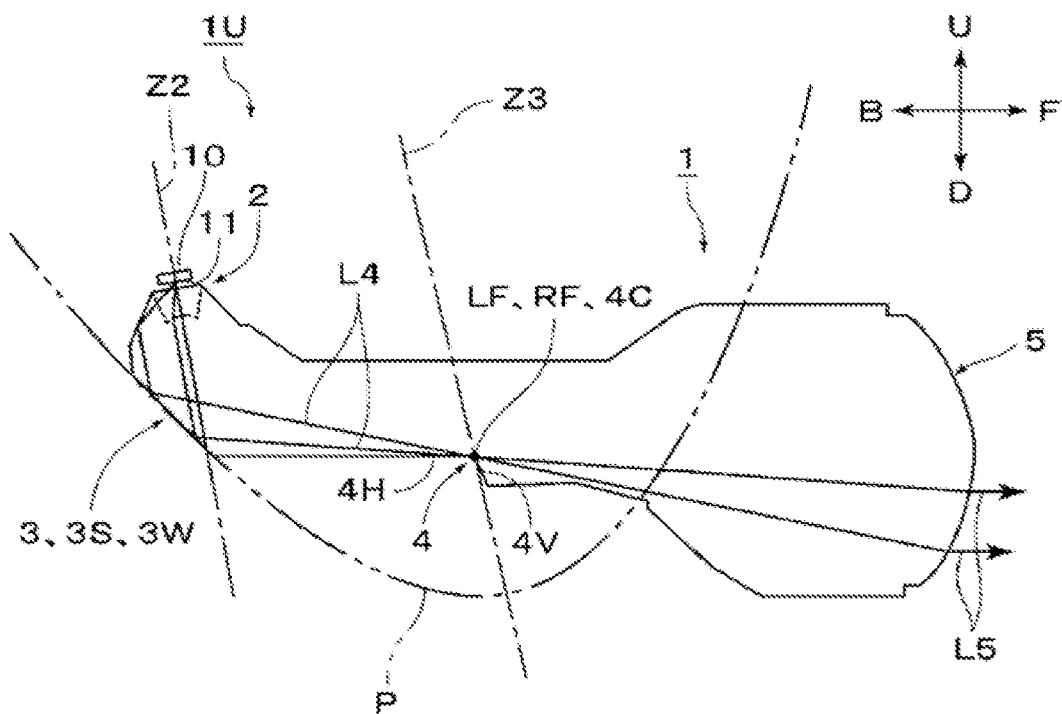
FIG. 3 is a longitudinal cross-sectional view (a vertical cross-sectional view taken along line III-III in FIG. 1) of optical paths in the lens.

As illustrated in FIGS. 1, 2, and 3, the vehicle lighting appliance unit 1U includes multiple (four in this example) light sources 10 and one lens 1. The vehicle lighting appliance unit 1U emits a low-beam light distribution pattern, which will be described later, to the front of the vehicle.

The low-beam light distribution pattern has a horizontal cutoff line along the left-right direction of the vehicle on the upper side, and illuminates the road surface below the cutoff line, that is, the road surface in front of the vehicle to the front side of the vehicle, which is a road surface in a wide range in the left-right direction.

(Description of Light Sources 10)

In this example, the light sources 10 are light sources of a self-luminous semiconductor light-emitting element (semiconductor light-emitting element) type such as LEDs, OELs, or OLEDs (organic ELs). As illustrated in FIGS. 1, 2, and 3, the light sources 10 each have a light-emitting surface 11. The light-emitting surface 11 is disposed on the upper side relative to an incidence part 2 of the lens 1 to be described later. In FIGS. 6, 8, 12, and 13, the light-emitting surface 11 is indicated by a point (the center point of the light-emitting surface 11).

(Description of Lens 1)

The lens 1 receives light L0 from the light sources 10 and emits a light distribution pattern having a horizontal cutoff line along the left-right direction of the vehicle to the front of the vehicle.

In this example, the lens 1 is made of a colorless and transparent resin material, such as an acrylic resin, a polycarbonate (PC), and a poly(methyl methacrylate) (PMMA), and a methacrylic resin. As illustrated in FIGS. 1 to 9, 12, and 13, the lens 1 includes incidence parts 2, a reflective surface 3, a cutoff-line forming part 4, an emission surface 5, and a prism part 12.

(Description of Incidence Part 2)

The incidence parts 2 are provided on an upper surface of one end portion (rear end portion) of the lens 1. Four incidence parts 2 corresponding to the four light sources 10 are provided. The four incidence parts 2 are aligned in the left-right direction. The incidence parts 2 on which at least a portion of the light L0 from the light sources 10 is incident as parallel light.

Figure 12:
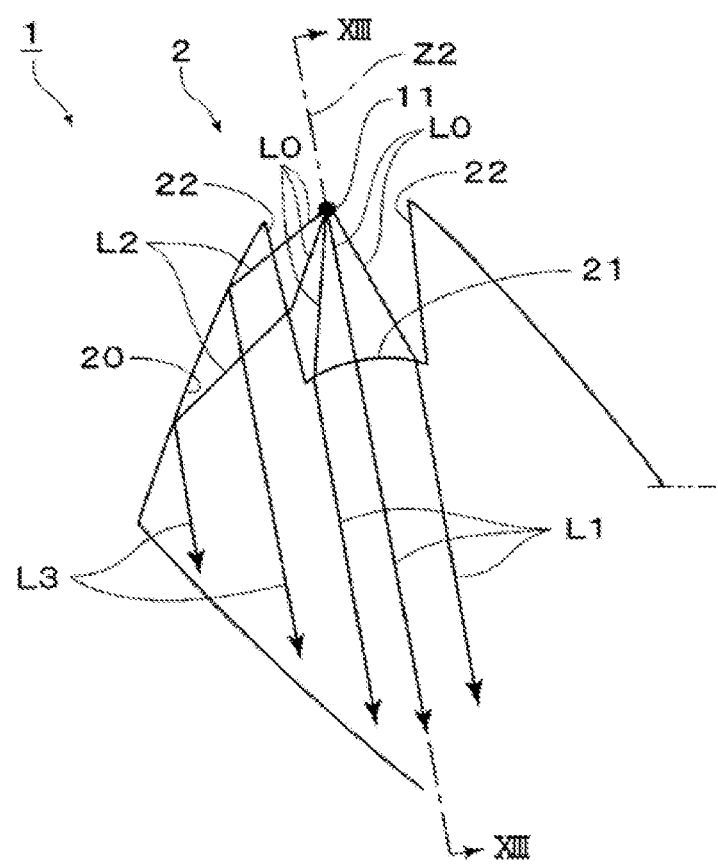
FIG. 12 is a partially enlarged longitudinal cross-sectional view (a partially enlarged vertical cross-sectional view that is a partially enlarged longitudinal cross-section corresponding to FIG. 3) of optical paths of an incidence part of the lens.
Figure 13:
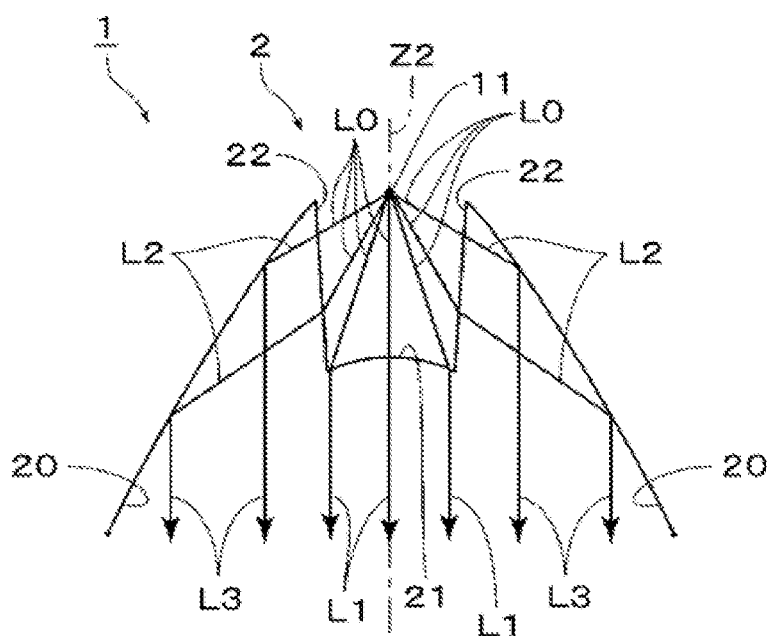
FIG. 13(A) is a partially enlarged longitudinal cross-sectional view (a partially enlarged vertical cross-sectional view that is a cross-sectional view taken along the line XIII-XIII in FIG. 12) of optical paths of an incidence part of the lens.
[FIG. 13(B)]
Figure 13:
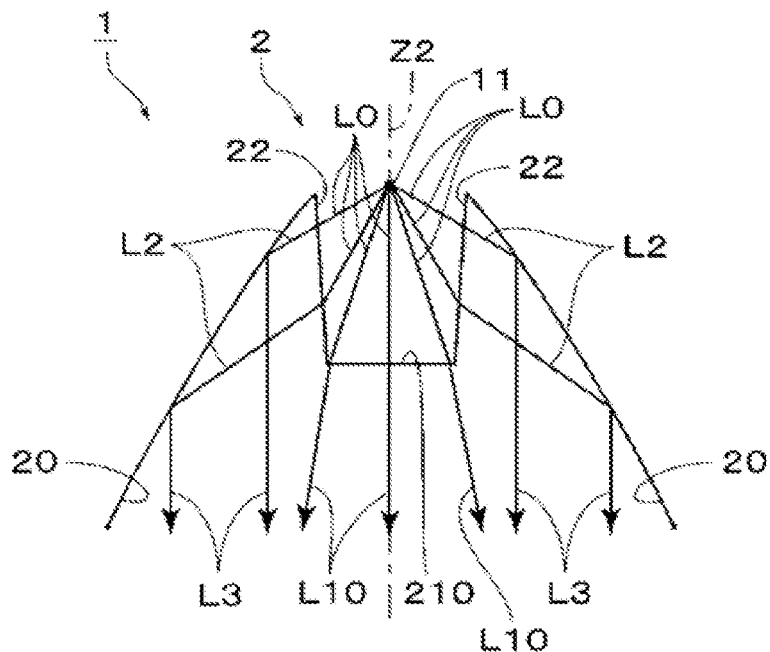

As illustrated in FIGS. 12, 13(A), and 13(B), the incidence parts 2 each includes a reflective surface 20, first incidence surfaces 21 and 210, and a second incidence surface 22. The reflective surface 20 of each of the incidence parts 2 is hereinafter referred to as a "first reflective surface 20" in order to distinguish it from the reflective surface 3 (a reflective surface described in the claims).

Each incidence part 2 has an incidence-part optical axis Z2. The incidence-part optical axis Z2 passes through the centers of the first reflective surface 20, the first incidence surfaces 21 and 210, and the second incidence surface 22 of the incidence part 2. The first incidence surfaces 21 and 210 and the second incidence surface 22 have a concave shape relative to the first reflective surface 20.

As illustrated in FIGS. 12 and 13(A), the first incidence surface 21 is a surface on which light L0 having solid angles of approximately 70 to 80 degrees with the center of the light-emitting surface 11 as a point (vertex of a corner) among the light L0 from the light-emitting surface 11 is refracted and incident as first incident light L1. The solid angle is not particularly limited. The first incident light L1 is parallel light that is parallel or substantially parallel to the incidence-part optical axis Z2. The first incidence surface 21 is provided on the lower side of the light-emitting surface 11. The first incidence surface 21 is a refractive surface of a rotational hyperboloid generated by rotating a hyperbola including the center of the light-emitting surface 11 or the vicinity as a focal point around a main axis of the hyperbola (the incidence-part optical axis Z2) as a rotation axis. The first incident light L1 that is the parallel light is suitable for forming a condensing type light distribution pattern.

In place of the first incidence surface 21 illustrated in FIGS. 12 and 13(A), a first incidence surface 210 illustrated in FIG. 13(B) may be used as the first incidence surface. As illustrated in FIG. 13(B), the first incidence surface 210 is a surface on which light L0 having solid angles of approximately 70 to 80 degrees with the center of the light-emitting surface 11 as a point (vertex of a corner) among the light L0 from the light-emitting surface 11 is refracted and incident as first incident light L10. The solid angle is not particularly limited. The first incident light L10 is diffused light that diffuses relative to the incidence-part optical axis Z2. The first incidence surface 210 is provided on the lower side of the light-emitting surface 11. The first incidence surface 210 is a cylindrical or substantially cylindrical refractive surface. The first incident light L10 that is the diffused light is suitable for forming a diffusing type light distribution pattern.

In this way, any first incidence surface can be selected from the first incidence surface 21 illustrated in FIGS. 12 and 13(A) and the first incidence surface 210 illustrated in FIG. 13(B) in accordance with the condensing type light distribution pattern or the diffusing type light distribution pattern.

As illustrated in FIGS. 12, 13(A), and 13(B), the second incidence surface 22 is a surface on which light L0 having solid angles within the range of approximately 70 to 80 degrees to approximately 180 degrees with the center of the light-emitting surface 11 as a point (vertex of a corner) among the light L0 from the light-emitting surface 11 is refracted and incident as second incident light L2. The solid angle is not particularly limited. The second incidence surface 22 is a sidewall surface of the outer circumferences of the first incidence surfaces 21 and 210, and is provided outside the light-emitting surface 11. The second incidence surface 22 is a refractive surface of a rotating surface generated by rotating a straight line or a curved line around the incidence-part optical axis Z2 as a rotation axis. The second incidence surface 22 is a refractive surface tilting at least by a draft angle (not illustrated) of a mold (not illustrated) of the lens 1 relative to the direction of the incidence-part optical axis Z2.

The first reflective surface 20 is a surface that totally reflects the second incident light L2 entering from the second incidence surface 22 as reflected light L3 parallel or substantially parallel to the incidence-part optical axis Z2. The reflected light L3 from the first reflective surface 20 is hereinafter referred to as "first reflected light L3" in order to distinguish it from the reflected light from the reflective surface 3 (reflected light described in the claims).

Here, when the first incidence surface 210 illustrated in FIG. 13(B) is selected as the first incidence surface, the first incident light L10 from the first incidence surface 210 is diffused light, not parallel light. On the other hand, the second incident light L2 (that is, a part of the incident light) from the second incidence surface 22 is reflected by the first reflective surface 20 as the first reflected light L3 that is parallel light parallel or substantially parallel to the incidence-part optical axis Z2. As a result, the incidence part 2 can cause at least a portion of the light L0 from the corresponding light source 10 (that is, the second incident light L2) to be incident as parallel light (that is, the first reflected light L3).

In this way, as illustrated in FIGS. 12 and 13(A), the incidence part 2 causes the light L0 from the corresponding light source 10 to be incident as the first incident light L1 that is parallel light and the first reflected light L3 that is the second incident light L2 and parallel light. Alternatively, as illustrated in FIGS. 12 and 13(B), the incidence part 2 causes the light L0 from the corresponding light source 10 to be incident as the first incident light L10 that is diffused light and the first reflected light L3 that is the second incident light L2 and parallel light.

(Description of Reflective Surface 3)

The reflective surface 3 is provided on a lower surface of one end portion (rear end portion) of the lens 1. The incidence part 2 and the reflective surface 3 are arranged vertically. As illustrated in FIGS. 3, 4, and 6 to 9, the reflective surface 3 is based on a paraboloid of revolution P (see a two-dot chain line in FIGS. 3 and; 6), and a rotation axis of the basic paraboloid of revolution P is set as a reflective-surface optical axis Z3. The reflective surface 3 has a reflective-surface focal point RF at the focal point of the paraboloid of revolution P. The reflective surface 3 reflects the incident light from the incidence part 2 (the first incident light L1 and the first reflected light L3 that is parallel light illustrated in FIGS. 12 and 13(A), or the first incident light L10 that is diffused light and the first reflected light L3 that is parallel light illustrated in FIG. 13(B), which are hereinafter referred to as "incident light L1 and L3, or L10 and L3") is reflected as reflected light L4 toward the cutoff-line forming part 4 and the emission surface 5.

The reflective surface 3 is hereinafter referred to as a "second reflective surface 3" in order to distinguish it from the first reflective surface 20 (a reflective surface described in the claims). The reflected light L4 from the second reflective surface 3 is hereinafter referred to as "second reflected light L4" in order to distinguish it from the first reflected light L3 from the first reflective surface 20.

The second reflective surface 3 has a condensing second reflective surface 3S in the middle portion in the left-right direction and a diffusing second reflective surfaces 3W in both left and right side portions. The condensing second reflective surface 3S corresponds to two light sources 10 and two incidence parts 2 among the four light sources 10 and four incidence parts 2. The condensing second reflective surface 3S reflects the light L0 from the middle two light sources 10 and the incident light from the middle two incidence parts 2 as the second reflected light L4 to form the condensing low-beam light distribution pattern LP (see FIG. 11(C)) out of the low-beam light distribution patterns.

On the other hand, the diffusing second reflective surfaces 3W correspond to the two left and right light sources 10 and the two left and right incidence parts 2 among the four light sources 10 and the four incidence parts 2. The diffusing second reflective surfaces 3W reflect the light L0 from the two left and right light sources 10, that is, the incident light from the two left and right incidence parts 2, as the second reflected light L4 to form a diffusing low-beam light distribution pattern (not illustrated). The diffusing low-beam light distribution pattern is a light distribution pattern diffused in the left-right direction and to the lower side relative to the condensing low-beam light distribution pattern LP, illustrated in FIG. 11(C).

The low-beam light distribution pattern is formed by superimposing the condensing low-beam light distribution pattern LP and the diffusing low-beam light distribution pattern. The low-beam light distribution pattern illuminates the area in front of the vehicle.

(Condensing Low-Beam Light Distribution Pattern LP)

As illustrated in FIG. 11(C), the condensing low-beam light distribution pattern LP (hereinafter, referred to as a "low-beam light distribution pattern LP") has horizontal cutoff lines along the left-right direction of the vehicle on the upper side. The cutoff lines include a lower horizontal cutoff line CLD on the right side, an upper horizontal cutoff line CLU on the left side, and an oblique cutoff line CLS in the middle.

In the low-beam light distribution pattern LP, an intersection of the lower horizontal cutoff line CLD and the oblique cutoff line CLS is an elbow point, and a region in the vicinity of the elbow point is a high luminous intensity region having the highest luminous intensity.

(Description of Cutoff-Line Forming Part 4)

The cutoff-line forming part 4 controls a portion of the second reflected light L4 from the second reflective surface 3 to form cutoff lines along the left-right direction of the vehicle, that is, the lower horizontal cutoff line CLD, the upper horizontal cutoff line CLU, and the oblique cutoff line CLS of the low-beam light distribution pattern LP illustrated in FIG. 11(C).

The cutoff-line forming part 4 is provided between the second reflective surface 3 and the emission surface 5. The cutoff-line forming part 4 is provided on a lower surface of a middle portion of the lens 1 in the front-rear direction. The cutoff-line forming part 4 has a corner portion 4C formed by a horizontal surface 4H and a vertical surface 4V. The vertical surface 4V tilts backward on the upper side and forward on the lower side.

The corner portion 4C of the cutoff-line forming part 4 extends linearly in the left-right direction of the vehicle on an emission-surface focal line LFL described later or in the vicinity of the emission-surface focal line LFL. Although the cutoff-line forming part 4 has a linear shape in this example, the cutoff-line forming part 4 may curve along a virtual image plane VS described later of the emission surface 5. That is, it is sufficient that the cutoff-line forming part 4 have a shape parallel or substantially parallel to the left-right direction of the vehicle.

The cutoff-line forming part 4 includes a lower horizontal cutoff-line forming part 4D, an upper horizontal cutoff-line forming part 4U, and an oblique cutoff-line forming part 4S. The lower horizontal cutoff-line forming part 4D is provided in a portion on the left side of the center in the left-right direction, and forms the lower horizontal cutoff line CLD. The upper horizontal cutoff-line forming part 4U is provided in a portion on the right side of the center in the left-right direction, and forms the upper horizontal cutoff line CLU. The oblique cutoff-line forming part 4S is provided in a portion at the center in the left-right direction, and forms the oblique cutoff line CLS.

For example, the cutoff-line forming part 4 may block the light by refracting or internally reflecting the light reaching the cutoff-line forming part 4 in a direction different from the direction of the emission surface 5, or a light absorbing layer may be provided in a portion corresponding to the cutoff-line forming part 4 in the horizontal surface 4H including the corner portion 4C and the light may be absorbed by the light absorbing layer. The light internally reflected or refracted by the cutoff-line forming part 4 is emitted to the outside of the lens 1, and is blocked or absorbed by an inner panel (inner housing or the like) provided outside the lens 1 and inside the lamp compartment 103, and thus is not emitted to the outside of the lamp compartment 103.

(Description of Emission Surface 5)

The emission surface 5 is provided on a front surface of an other end portion (front end portion) of the lens 1. The emission surface 5 has an emission-surface focal point LF described later. The emission surface 5 emits the second reflected light L4 passing through the cutoff-line forming part 4 as a light distribution pattern having cutoff lines. That is, the emission surface 5 emits the second reflected light L4 in front of the vehicle as emitted light L5. The emitted light L5 forms the low-beam light distribution pattern LP (the low-beam light distribution pattern LP having the lower horizontal cutoff line CLD, the upper horizontal cutoff line CLU, and the oblique cutoff line CLS) illustrated in FIG. 11(C).

(Description of Virtual Image Plane VS of Emission Surface 5)

The virtual image plane VS of the emission surface 5 will now be described with reference to FIG. 14. A normal (typical) lens has an image plane. The image plane is a plane (curved plane) formed by collecting points at which multiple parallel rays from the outside of the lens are incident on the incidence surface, emitted from the emission surface, and are condensed (converged).

However, the lens 1 has only the emission surface 5. Therefore, no image plane exists on the emission surface 5, and the virtual image plane VS (see FIG. 14) is formed in the vicinity of the image plane.

Figure 14:
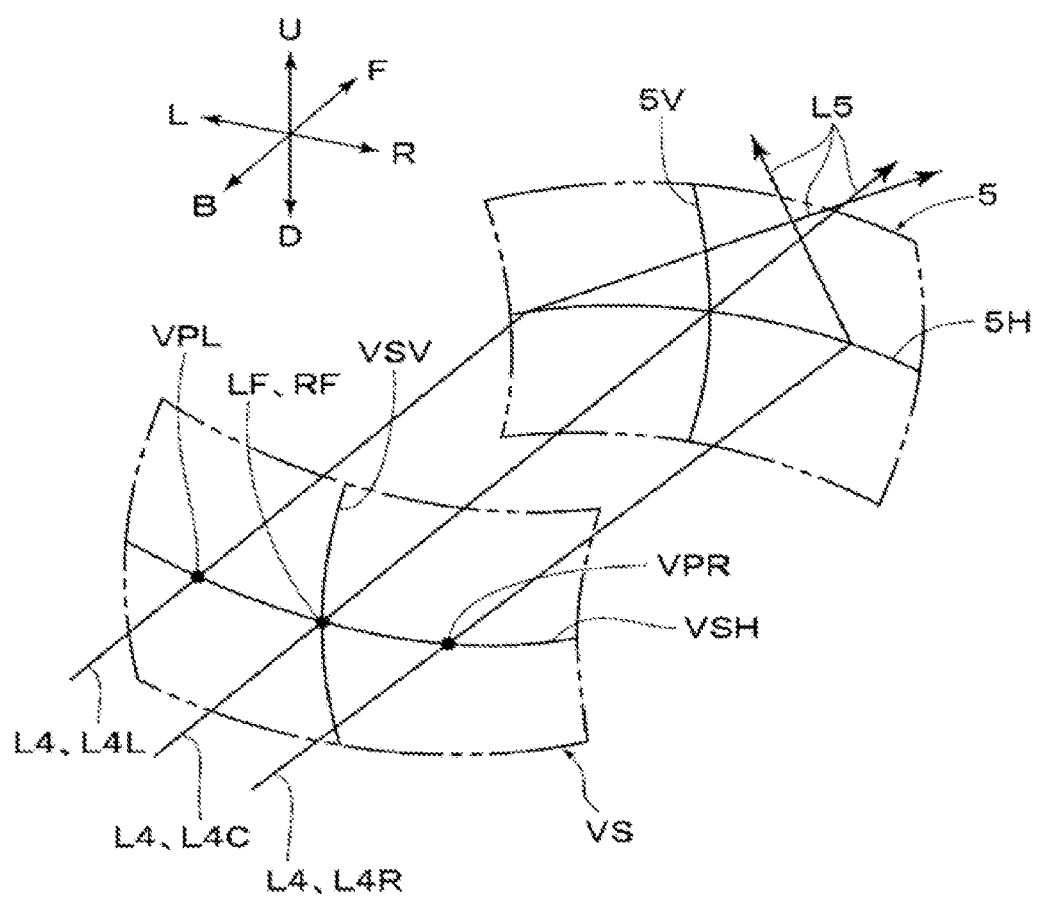
FIG. 14 is an explanatory view of a virtual image plane of an emission surface.

In FIG. 14, reference sign "5H" denotes a transverse cross-sectional line of the emission surface 5 taken along the lateral direction (horizontally direction) of the emission surface 5. Reference sign "5V" denotes a longitudinal cross-sectional line of the emission surface 5 taken along the longitudinal direction (vertical direction) of the emission surface 5. The transverse cross-sectional line 5H and the longitudinal cross-sectional line 5V are curved along the curved emission surface 5.

In FIG. 14, reference sign "VSH" denotes a transverse cross-sectional line of the virtual image plane VS taken along the lateral direction (horizontally direction) of the virtual image plane VS. Reference sign "VSV" denotes a longitudinal cross-sectional line of the virtual image plane VS taken along the longitudinal direction (vertical direction) of the virtual image plane VS. The transverse cross-sectional line VSH and the longitudinal cross-sectional line VSV are curved along the virtual image plane VS.

(Description of Reflective-surface Focal Point RF and Emission-surface Focal Point LF)

Figure 4:
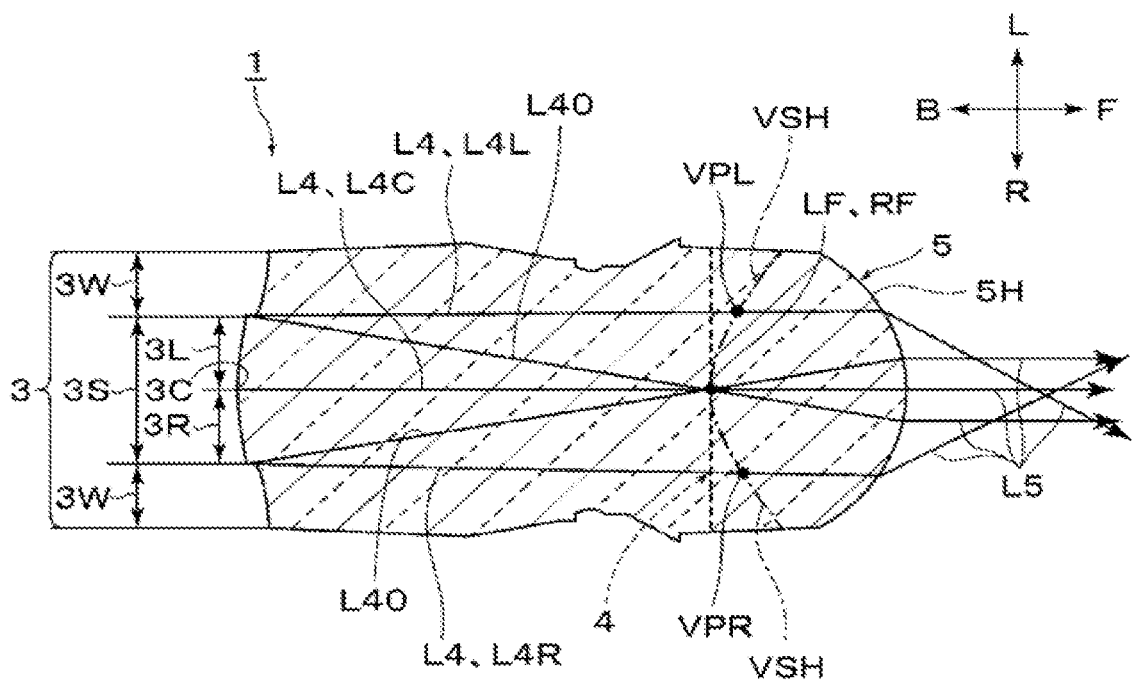
FIG. 4 is a transverse cross-sectional view (a horizontal cross-sectional view taken along line IV-IV in FIG. 2) of optical paths in the lens.
Figure 5:
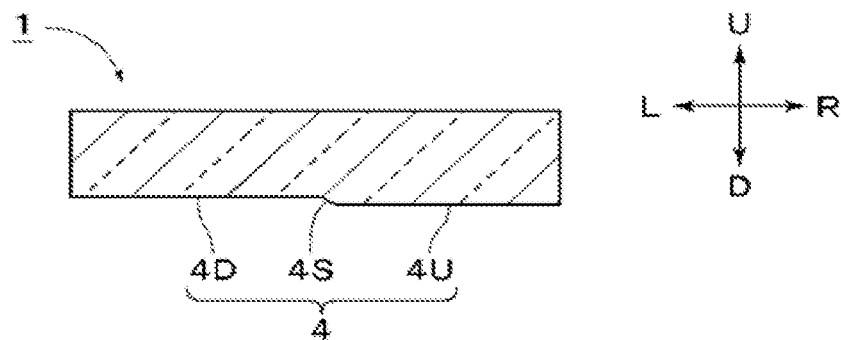
FIG. 5 is a longitudinal cross-sectional view (a vertical sectional view taken along line V-V in FIG. 2) of a cutoff-line forming part of the lens.
Figure 7:
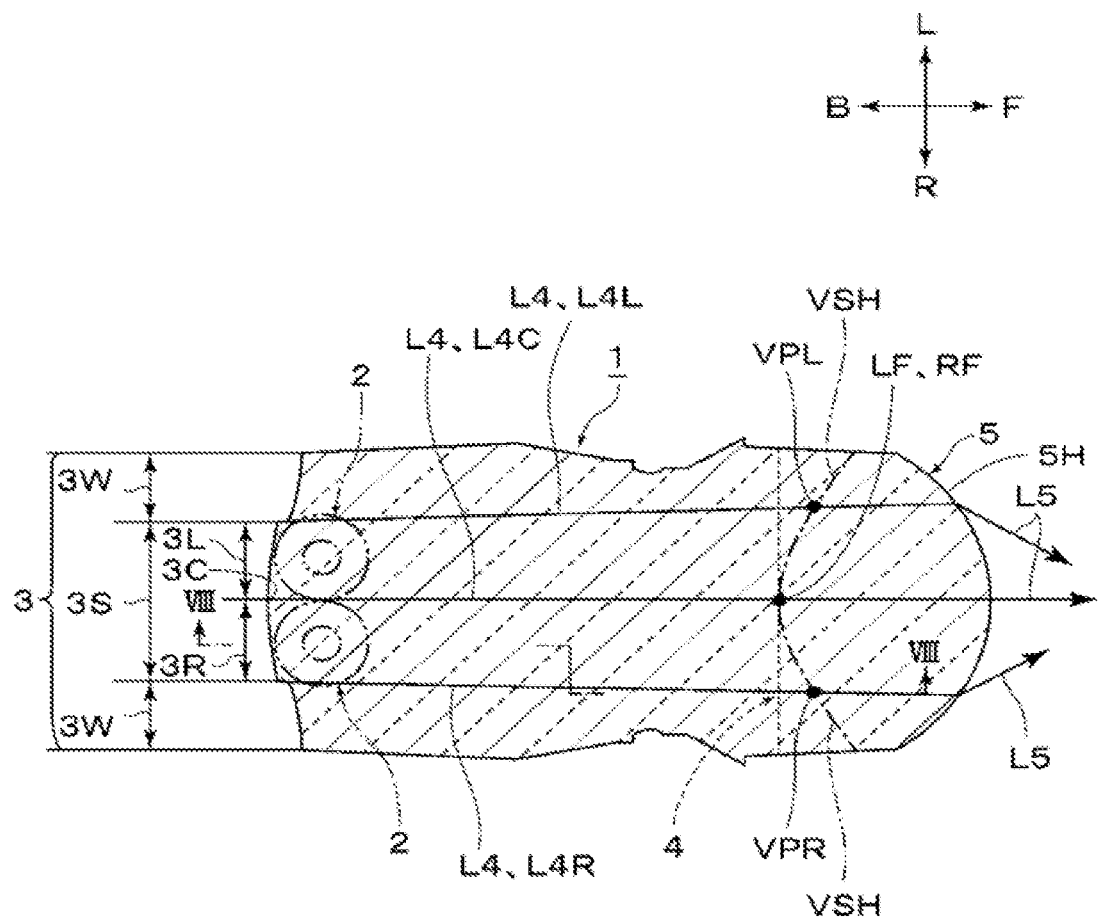
FIG. 7 is a transverse cross-sectional view (a horizontal cross-sectional view corresponding to FIG. 4) of the lens.

The second reflective surface 3 has a reflective-surface focal point RF at the basic focal point of the paraboloid of revolution P. The emission surface 5 has an emission-surface focal point LF at the reflective-surface focal point RF or near the reflective-surface focal point RF. As illustrated in FIGS. 4 and 7, in this example, the reflective-surface focal point RF and the emission-surface focal point LF coincide with each other. Alternatively, the reflective-surface focal point RF and the emission-surface focal point LF may not coincide with each other.

Here, a case where the second reflective surface 3 is a reflective surface formed of a basic (pure) paraboloid of revolution P will be described. In this case, as illustrated in FIG. 4, since the second reflected light L40 is concentrated (condensed) on one focal point (the reflective-surface focal point RF and the emission-surface focal point LF), a low-beam light distribution pattern LP2 having narrow (small) diffusion widths on the left and right sides is formed, as illustrated in FIG. 11(A). The low-beam light distribution pattern LP2 in which the left and right diffusion widths are narrow (small) is not suitable for the light distribution pattern of the vehicle lighting appliance. Similar to the low-beam light distribution pattern LP illustrated in FIG. 11(C), the low-beam light distribution pattern LP2 having narrow (small) left and right diffusion widths has a lower horizontal cutoff line CLD2, an upper horizontal cutoff line CLU2, and an oblique cutoff line CLS2.

Therefore, the second reflective surface 3 is a planar reflective surface formed by continuously extending the basic paraboloid of revolution P in the left-right direction of the vehicle. In this way, the second reflective surface 3 diffuses the second reflected light L4 in the left-right direction without concentrating (condensing) the second reflected light L4 on one focal point (the reflective-surface focal point RF, the emission-surface focal point LF), as illustrated in FIG. 4. As a result, the low-beam light distribution patterns LP and LP1 having wide left and right diffusion widths are formed, as illustrated in FIGS. 11(B) and 11(C). The low-beam light distribution pattern LP, LP1 in which the left and right diffusion widths are wide is suitable for the light distribution pattern of the vehicle lighting appliance. Similar to the low-beam light distribution pattern LP illustrated in FIG. 11(C), the low-beam light distribution pattern LP1 having wide left and right diffusion widths has a lower horizontal cutoff line CLD1, an upper horizontal cutoff line CLU1, and an oblique cutoff line CLS1.

(Description of Condensing Second Reflective Surface 3S)

As illustrated in FIGS. 4 and 7, the condensing second reflective surface 3S of the second reflective surface 3 has a central second reflective region 3C, a left second reflective region 3L, and a right second reflective region 3R.

As illustrated in FIGS. 4 and 7, the central second reflective region 3C controls the second reflected light L4 and L4C passing through the reflective-surface focal point RF and the emission-surface focal point LF. Similarly, as illustrated in FIGS. 4 and 7, the left second reflective region 3L controls the second reflected light L4 and L4L passing through, from the left side, the reflective-surface focal point RF and the emission-surface focal point LF. Similarly, as illustrated in FIGS. 4 and 7, the right second reflective region 3R controls the second reflected light L4 and L4R passing through, from the right side, the reflective-surface focal point RF and the emission-surface focal point LF.

Here, as illustrated in FIGS. 4, 7, and 14, the second reflected light L4 and L4L from the left second reflective region 3L passes through an arbitrary point VPL on the transverse cross-sectional line VSH of the virtual image plane VS. The second reflected light L4 and L4R from the right second reflective region 3R passes through an arbitrary point VPR of the transverse cross-sectional line VSH of the virtual image plane VS.

(Description of Incidence-Part Optical Axis Z2 and Reflective-Surface Optical Axes Z3, ZC, ZL, and ZR)

The incidence-part optical axis Z2 and the reflective-surface optical axes Z3, ZC, ZL, and ZR will be described with reference to FIG. 6.

The central second reflective region 3C has a central reflective-surface optical axis ZC. The central reflective-surface optical axis ZC and the incidence-part optical axis Z2 are parallel or substantially parallel to each other. Since the central second reflective region 3C is a parabola of the basic paraboloid of revolution P, the central reflective-surface optical axis ZC is the reflective-surface optical axis Z3. For this reason, hereinafter, in FIG. 6, the central reflective-surface optical axis ZC and the reflective-surface optical axis Z3 can be regarded as being identical to the incidence-part optical axis Z2. Here, an angle formed by the incidence-part optical axis Z2 (the central reflective-surface optical axis ZC and the reflective-surface optical axis Z3) and a vertical line ZV is Z$\theta$C degrees.

The left second reflective region 3L has a left reflective-surface optical axis ZL. As indicated by a solid arrow in FIG. 6, the left second reflective region 3L gradually tilts toward the side opposite to the cutoff-line forming part 4 and the emission surface 5 as it shifts to the left around a rotation axis O of the upper end portion of the second reflective surface 3. As a result, the left reflective-surface optical axis ZL gradually tilts toward the vertical line ZV relative to the incidence-part optical axis Z2 (the central reflective-surface optical axis ZC and the reflective-surface optical axis Z3) as it shifts to the left. Here, the angle formed by the left reflective-surface optical axis ZL and the vertical line ZV is Z$\theta$L degrees. The angle Z$\theta$L degrees formed by the left reflective-surface optical axis ZL and the vertical line ZV is smaller than the angle Z$\theta$C degrees formed by the incidence-part optical axis Z2 (the central reflective-surface optical axis ZC and the reflective-surface optical axis Z3) and the vertical line ZV. As a result, the left reflective-surface optical axis ZL tilts toward the vertical line ZV relative to the central reflective-surface optical axis ZC.

The right second reflective region 3R has a right reflective-surface optical axis ZR. As similarly indicated by a solid arrow in FIG. 6, the right second reflective region 3R gradually tilts toward the side opposite to the cutoff-line forming part 4 and the emission surface 5 as it shifts to the right around a rotation axis O of the upper end portion of the second reflective surface 3. As a result, the right reflective-surface optical axis ZR gradually tilts toward the vertical line ZV relative to the incidence-part optical axis Z2 (the central reflective-surface optical axis ZC and the reflective-surface optical axis Z3) as it shifts to the right. Here, the angle formed by the right reflective-surface optical axis ZR and the vertical line ZV is Z$\theta$R degrees. The angle Z$\theta$R degrees formed by the right reflective-surface optical axis ZR and the vertical line ZV is smaller than the angle Z$\theta$C degrees formed by the incidence-part optical axis Z2 (the central reflective-surface optical axis ZC and the reflective-surface optical axis Z3) and the vertical line ZV. As a result, the right reflective-surface optical axis ZR tilts toward the vertical line ZV relative to the central reflective-surface optical axis ZC.

(Description of Incidence-Part Optical Axis Z2 and Reflective-Surface Optical Axes ZL and ZR of PTL 2)

The incidence-part optical axis Z2 and the reflective-surface optical axes ZL and ZR of PTL 2 will be described with reference to FIG. 8(A). Note that the same components and reference signs as those in the embodiment are used.

In PTL 2, the a reflective-surface optical axis ZL of a left second reflective region 30L and the incidence-part optical axis Z2 are parallel or substantially parallel to each other, and a reflective-surface optical axis ZR of a right second reflective region 30R and the incidence-part optical axis Z2 are parallel or substantially parallel to each other.

Therefore, as illustrated in FIG. 8(A) of PTL 2, the left second reflective region 30L and the right second reflective region 30R are identical to the central second reflective region 3C.

Then, second reflected light L41 reflected by the left second reflective region 30L and the right second reflective region 30R is concentrated (condensed) on the emission-surface focal point LF similarly to second reflected light L4C reflected by the central second reflective region 3C.

Here, the transverse cross-sectional line VSH of the virtual image plane VS of the emission surface 5 is formed so as to be separated from the cutoff-line forming part 4 to the emission surface 5 side as it shifts to the left and right from the reflective-surface focal point RF and the emission-surface focal point LF, as indicated by the curved one dot chain lines in FIGS. 4 and 7. Therefore, as illustrated in FIG. 8(A), a portion L4D of the second reflected light L41 reflected by the left second reflective region 30L and the right second reflective region 30R passes downward behind the arbitrary points VPR and VPL of the transverse cross-sectional line VSH of the virtual image plane VS and in front of the corner portion 4C of the cutoff-line forming part 4.

The second reflected light L4D (hereinafter, referred to as "downward second reflected light L4D") passing downward between the arbitrary points VPR and VPL and the cutoff-line forming part 4 is emitted from the emission surface 5 as upward emitted light (not illustrated). As a result, as illustrated in FIG. 11(B), the downward second reflected light L4D causes the formation of the cutoff lines CLD1 and CLU1 that are warped upward relative to the horizontal cutoff lines CLD and CLU.

(Another Description of Incidence-Part Optical Axis Z2 and Reflective-Surface Optical Axes Z3, ZC, ZL, and ZR)

Figure 6:
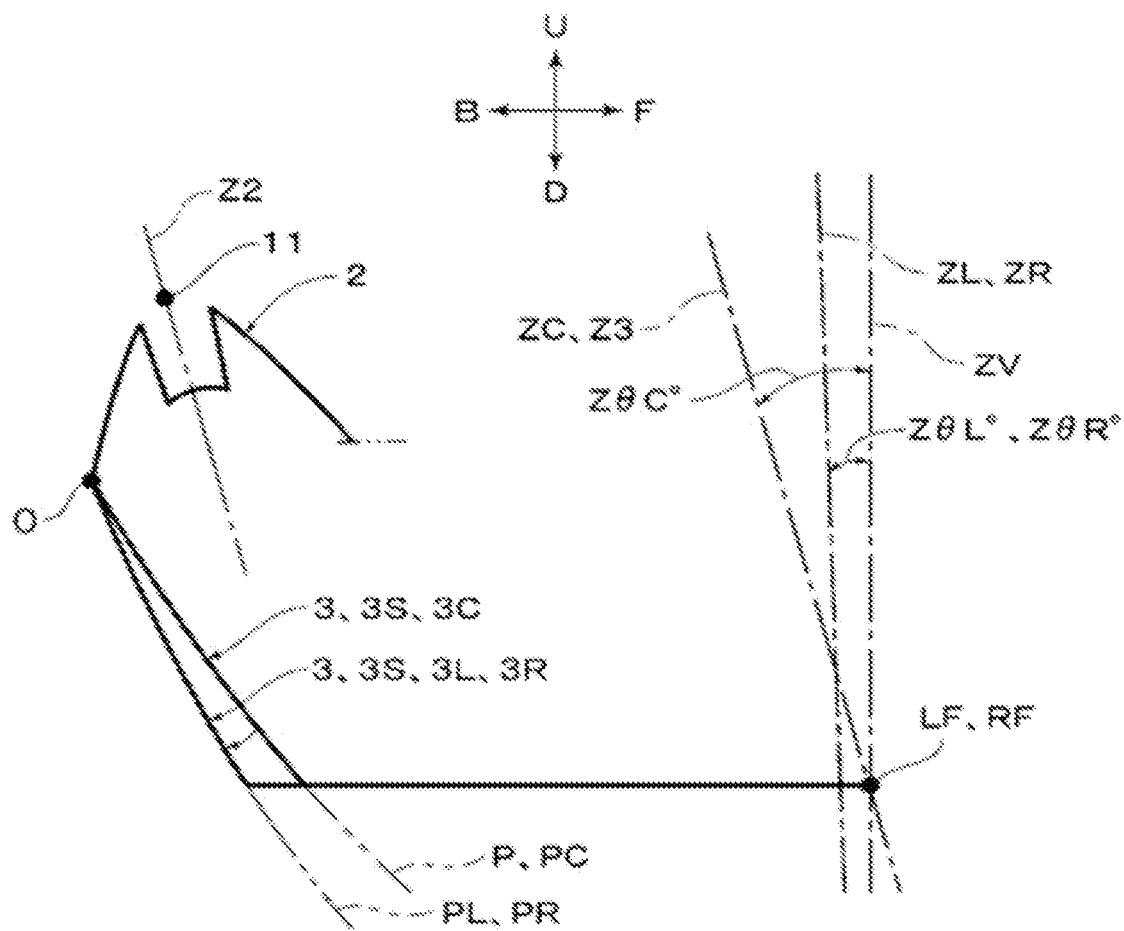
FIG. 6 is an explanatory view (a partially enlarged view of FIG. 3) of a main portion of the lens (an incidence-part optical axis and a reflective-surface optical axis).

Therefore, as illustrated in FIG. 6, the left reflective-surface optical axis ZL tilts toward the vertical line ZV relative to the central reflective-surface optical axis ZC, and the right reflective-surface optical axis ZR similarly tilts toward the vertical line ZV relative to the central reflective-surface optical axis ZC. Then, second reflected light L4L reflected by the left second reflective region 3L (hereinafter referred to as "left second reflected light L4L") and second reflected light L4R reflected by the right second reflective region 3R (hereinafter referred to as "right second reflected light L4R") are directed downward relative to the second reflected light L4C reflected by the central second reflective region 3C (hereinafter referred to as "central second reflected light L4C").

As a result, as illustrated in FIG. 8(B), a portion of the left second reflected light L4L and the right second reflected light L4R, which are directed downward, is reflected as upward second reflection light L4U by the horizontal surface 4H behind the corner portion 4C of the cutoff-line forming part 4.

Thus, the light quantity of downward second reflected light L4D can be reduced as compared with PTL 2 (a case where the reflective-surface optical axes ZL and ZR and the incidence-part optical axis Z2 are parallel or substantially parallel to each other). Therefore, the horizontal cutoff lines CLD and CLU, as illustrated in FIG. 11(C), are formed without the cutoff lines CLD1 and CLU1 that are warped upward, as illustrated in FIG. 11(B).

(Description of Left Reflective-Surface Optical Axis ZL and Right Reflective-Surface Optical Axis ZR)

As illustrated in FIGS. 6 and 12, the incidence-part optical axis Z2 (the central reflective-surface optical axis ZC) tilts in a state where the direction of the incident light (particularly, the first incident light L1 and L3 that is parallel light) faces the emission surface 5 relative to the vertical line ZV. That is, the incidence-part optical axis Z2 tilts backward on the upper side and forward on the lower side.

The left reflective-surface optical axis ZL gradually shifts from a state parallel or substantially parallel to the incidence-part optical axis Z2 (the reflective-surface optical axis ZC) to a state parallel or substantially parallel to the vertical line ZV as it shifts from the reflective-surface focal point RF and the emission-surface focal point LF to the left side.

The right reflective-surface optical axis ZR gradually shifts from a state parallel or substantially parallel to the incidence-part optical axis Z2 (the reflective-surface optical axis ZC) to a state parallel or substantially parallel to the vertical line ZV as it shifts from the reflective-surface focal point RF and the emission-surface focal point LF to the right side.

An angle Z$\theta$L degrees formed by the left reflective-surface optical axis ZL and a vertical line ZV is set larger than an angle Z$\theta$R degrees formed by the right reflective-surface optical axis ZR and the vertical line ZV. As a result, the left reflective-surface optical axis ZL tilts toward the vertical line ZV relative to the right reflective-surface optical axis ZR, and is parallel or substantially parallel to the vertical line ZV.

Figure 9:
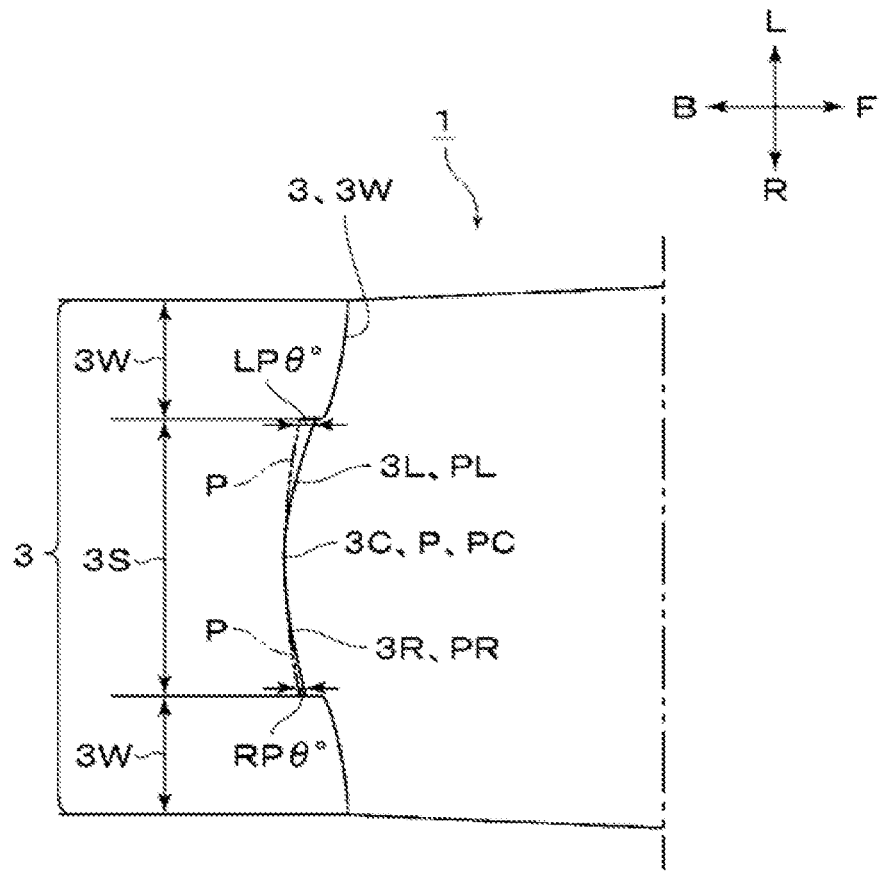
FIG. 9 is a partially enlarged transverse cross-sectional view of a reflective surface of the lens (a partially enlarged horizontal cross-sectional view that is a partially enlarged transverse cross-sectional view corresponding to FIG. 4).

As a result, as illustrated in FIG. 9, an angle LP$\theta$ degrees by which the left paraboloid of revolution PL tilts relative to a central paraboloid of revolution PC is larger than an angle RP$\theta$ degrees by which a right paraboloid of revolution PR tilts relative to the central paraboloid of revolution PC.

In FIG. 9, the left paraboloid of revolution PL forms the left second reflective region 3L. The right paraboloid of revolution PR forms the right second reflective region 3R. The central paraboloid of revolution PC forms the central second reflective region 3C. The central paraboloid of revolution PC forms the basic paraboloid of revolution P.

Figure 8:
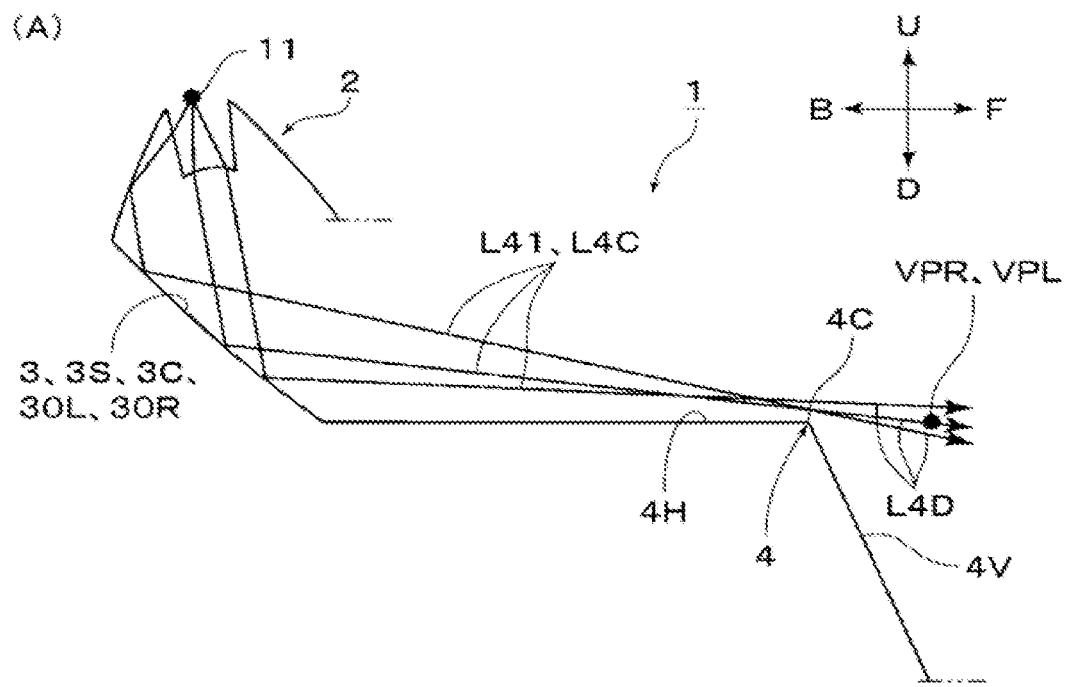
FIG. 8 is a partial longitudinal cross-sectional view (a partial vertical cross-sectional view taken along line VIII-VIII in FIG. 7) of optical paths in an incidence part and a reflective surface of the lens.
Figure 8:
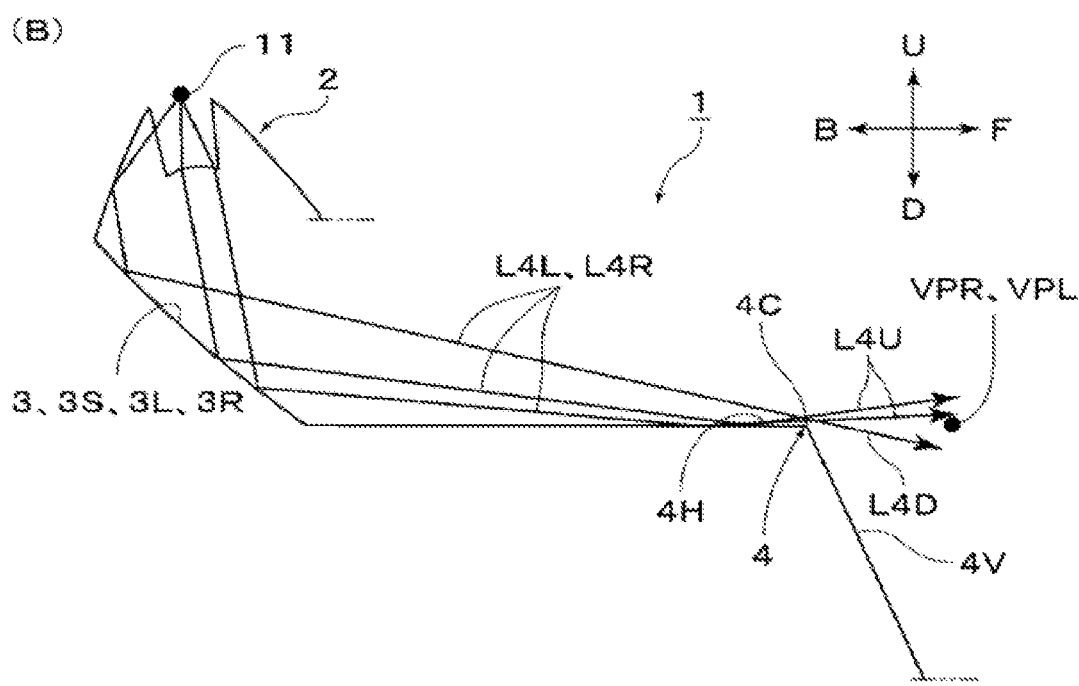

The second reflected light L4L from the left second reflective region 3L illustrated in FIG. 8 is largely directed downward as compared with the second reflected light L4R from the right second reflective region 3R. Then, the light quantity of the second reflected light L4L from the left second reflective region 3L that is reflected by the horizontal surface 4H behind the corner portion 4C of the cutoff-line forming part 4 and becomes the upward second reflection light L4U is larger than the light quantity of the second reflected light L4R from the right second reflective region 3R that is reflected by the horizontal surface 4H behind the corner portion 4C of the cutoff-line forming part 4 and becomes the upward second reflection light L4U.

As a result, the light quantity by which the left second reflected light L4L becomes the downward second reflected light L4D can be made smaller than the light quantity by which the right second reflected light L4R becomes the downward second reflected light L4D. That is, the light quantity of light warped upward from the lower horizontal cutoff line CLD formed by a left reflective region 3L can be made smaller than the light quantity of light warped upward from the upper horizontal cutoff line CLU formed by a right reflective region 3R.

Here, the low-beam light distribution pattern is defined by regulations. For example, as illustrated in FIG. 10, in the regulation of R123 (R149Class-C), BLL/BRR are points above the cutoff lines CLD, CLS, and CLU. The luminous intensity upper limit of the point BRR above the lower horizontal cutoff line CLD is set to 625 cd, which is lower than the luminous intensity upper limit (3550 cd) of the point BLL above the upper horizontal cutoff line CLU.

As a result, it is important to reduce the light quantity of light above the lower horizontal cutoff line CLD formed by a left reflective region 3L than the light quantity of light above the upper horizontal cutoff line CLU formed by a right reflective region 3R.

As described above, the left reflective-surface optical axis ZL is set so that it tilts toward the vertical line ZV relative to the right reflective-surface optical axis ZR and is parallel or substantially parallel to the vertical line ZV. Then, the light quantity of light above the lower horizontal cutoff line CLD formed by a left reflective region 3L can be made smaller than the light quantity of light above the upper horizontal cutoff line CLU formed by a right reflective region 3R. In this way, the low-beam light distribution pattern formed by the lens 1 can satisfy the regulations illustrated in FIG. 10.

(Explanation of Operation of Embodiments)

The lens 1 according to the present embodiment, the vehicle lighting appliance unit 1U according to the present embodiment, and the vehicle lighting appliance device 100 according to the present embodiment have the configurations described above, and the operation thereof will be explained below.

Four light sources 10 are turned on. Then, the light L0 from the four light sources 10 enters the lens 1 through the four incidence parts 2 of the lens 1. The incident light L1 and L3 or the incident light L10 and L3 entering the lens 1 from the middle two light sources 10 through the middle two incidence parts 2 is reflected as the second reflected light L4 by the condensing second reflective surface 3S in the middle portion of the second reflective surface 3.

A portion of the second reflected light L4 is controlled by the cutoff-line forming part 4. The second reflected light L4 passing through the cutoff-line forming part 4 is emitted in front of the vehicle as emitted light L5 from the emission surface 5. The emitted light L5 forms a condensing low-beam light distribution pattern LP illustrated in FIG. 11(C).

The incident light L1 and L3 or the incident light L10 and L3 entering the lens 1 from the two light sources 10 through the two incidence parts 2 is reflected as the reflected light (not illustrated) by the diffusing second reflective surfaces 3W in the left and right portions of the second reflective surface 3.

A portion of the reflected light L4 is controlled by the cutoff-line forming part 4. The reflected light passing through the cutoff-line forming part 4 is emitted in front of the vehicle as emitted light (not illustrated) from the emission surface 5. The emitted light forms a diffusing low-beam light distribution pattern (not illustrated).

The condensing low-beam light distribution pattern LP and the diffusing low-beam light distribution pattern are superimposed on each other to form a low-beam light distribution pattern (not illustrated), and the low-beam light distribution pattern is emitted in front of the vehicle.

(Explanation of Effect of Embodiment)

The lens 1 according to the present embodiment, the vehicle lighting appliance unit 1U according to the present embodiment, and the vehicle lighting appliance device 100 according to the present embodiment have the configurations and operations described above, and the effect thereof will be explained below.

In the lens 1 according to the present embodiment, the cutoff-line forming part 4 is provided in the left-right direction of the vehicle, that is, in a simplified shape. As a result, in the lens 1 according to the present embodiment, at the time of resin molding, a smooth flow of the resin is achieved in the cutoff-line forming part 4, and the flowability of the resin is improved. Moreover, in the lens 1 according to the present embodiment, since the cutoff-line forming part 4 is formed in a simplified shape extending in the left-right direction, the control of the low-beam light distribution pattern is facilitated and improved.

In the lens 1 according to the present embodiment, the reflective-surface optical axis ZC of the central second reflective region 3C and the incidence-part optical axis Z2 are parallel or substantially parallel to each other, and the reflective-surface optical axis ZL of the left second reflective region 3L and the reflective-surface optical axis ZR of the right second reflective region 3R tilt relative to the incidence-part optical axis Z2.

As a result, in the lens 1 according to the present embodiment, the left second reflected light L4L reflected by the left second reflective region 3L and the right second reflected light L4R reflected by the right second reflective region 3R are directed downward relative to the central second reflected light L4C reflected by the central second reflective region 3C.

As illustrated in FIG. 8(B), the lens 1 according to the present embodiment can reflect a portion of the left second reflected light L4L and the right second reflected light L4R, which are directed downward, as upward second reflection light L4U by the horizontal surface 4H behind the corner portion 4C of the cutoff-line forming part 4.

Thus, the lens 1 according to the present embodiment can reduce the light quantity of downward second reflected light L4D as compared with PTL 2 (a case where the reflective-surface optical axes ZL and ZR and the incidence-part optical axis Z2 are parallel or substantially parallel to each other). Therefore, the lens 1 according to the present embodiment can form the horizontal cutoff lines CLD and CLU, as illustrated in FIG. 11(C), without the cutoff lines CLD1 and CLU1 that are warped upward, as illustrated in FIG. 11(B).

That is, the lens 1 according to the present embodiment can form the horizontal cutoff lines CLD and CLU without the cutoff lines CLD1 and CLU1 warped upward even when the cutoff-line forming part 4 is provided in the left-right direction of the vehicle and is formed in a curved line shape (curved) approximate to the virtual image plane of the emission surface.

The lens 1 according to the present embodiment tilts with the incidence-part optical axis Z2 (the central reflective-surface optical axis ZC) tilting in a state where the direction of the incident light (particularly, the first incident light L1 and L3 that is parallel light) faces the emission surface 5 relative to the vertical line ZV. As a result, the lens 1 according to the present embodiment can efficiently reflect the incident light (particularly, the first incident light L1 and L3 that is parallel light) toward the emission surface 5 by the second reflective surface 3. As a result, the lens 1 according to the present embodiment can efficiently use the incident light (particularly, the first incident light L1 and L3 that is parallel light), and the light quantity of the low-beam light distribution pattern LP can be improved accordingly.

In the lens 1 according to the present embodiment, as the left reflective-surface optical axis ZL is shifted to the left side, it is shifted from a state of being parallel or substantially parallel to the incidence-part optical axis Z2 (the reflective-surface optical axis ZC) to a state of being parallel or substantially parallel to the vertical line ZV. That is, in the lens 1 according to the present embodiment, the left reflective-surface optical axis ZL tilts toward the vertical line ZV relative to the incidence-part optical axis Z2 (the central reflective-surface optical axis ZC). As a result, in the lens 1 according to the present embodiment, as described above, since the left reflective-surface optical axis ZL tilts relative to the incidence-part optical axis Z2, the above-described effects, that is, the flowability of the resin is improved, the control of the low-beam light distribution pattern is improved, and the cutoff lines without warpage can be formed.

Similar to the left reflective-surface optical axis ZL described above, in the lens 1 according to the present embodiment, as the right reflective-surface optical axis ZR is shifted to the right side, it is shifted from a state of being parallel or substantially parallel to the incidence-part optical axis Z2 (the reflective-surface optical axis ZC) to a state of being parallel or substantially parallel to the vertical line ZV. That is, in the lens 1 according to the present embodiment, the right reflective-surface optical axis ZR tilts toward the vertical line ZV relative to the incidence-part optical axis Z2 (the central reflective-surface optical axis ZC). As a result, in the lens 1 according to the present embodiment, as described above, since the right reflective-surface optical axis ZR tilts relative to the incidence-part optical axis Z2, the above-described effects, that is, the flowability of the resin is improved, the control of the low-beam light distribution pattern is improved, and the cutoff lines without warpage can be formed.

In the lens 1 according to the present embodiment, the left reflective-surface optical axis ZL is set so that it tilts toward the vertical line ZV relative to the right reflective-surface optical axis ZR and is parallel or substantially parallel to the vertical line ZV. As a result, the lens 1 according to the present embodiment can increase an angle LPθ degrees by which the left paraboloid of revolution PL tilts relative to a central paraboloid of revolution PC more than an angle RPθ degrees by which a right paraboloid of revolution PR tilts relative to the central paraboloid of revolution PC.

In the lens 1 according to the present embodiment, the second reflected light L4L from the left second reflective region 3L can be largely directed downward as compared with the second reflected light L4R from the right second reflective region 3R. In the lens 1 according to the present embodiment, the light quantity of the second reflected light L4L from the left second reflective region 3L that is reflected by the horizontal surface 4H behind the corner portion 4C of the cutoff-line forming part 4 and becomes the upward second reflection light L4U is larger than the light quantity of the second reflected light L4R from the right second reflective region 3R that is reflected by the horizontal surface 4H behind the corner portion 4C of the cutoff-line forming part 4 and becomes the upward second reflection light L4U. As a result, in the lens 1 according to the present embodiment, the light quantity by which the left second reflected light L4L becomes the downward second reflected light L4D can be made smaller than the light quantity by which the right second reflected light L4R becomes the downward second reflected light L4D. That is, in the lens 1 according to the present embodiment, the light quantity of light warped upward from the lower horizontal cutoff line CLD formed by the left second reflective region 3L can be made smaller than the light quantity of light warped upward from the upper horizontal cutoff line CLU formed by the right second reflective region 3R.

As described above, the lens 1 according to the present embodiment can reduce the light quantity above the lower horizontal cutoff line CLD formed by the left second reflective region 3L as compared with the light quantity above the upper horizontal cutoff line CLU formed by the right second reflective region 3R, and can form a low-beam light distribution pattern that can satisfy the regulations illustrated in FIG. 10.

Since the lens 1 according to the present embodiment includes the four light sources 10 and the four incidence parts 2 corresponding to the four light sources 10, the light quantity of the low-beam light distribution pattern can be increased.

(Descriptions of Examples Other Than Embodiments)

In the embodiments described above, the present invention is applied to left-hand traffic such as Japan and the United Kingdom. However, the present invention can also be applied to right-hand traffic in European and American countries. In the case of the right-hand traffic, the left and right in the left-hand traffic are reversed. For example, the low-beam light distribution pattern LP illustrated in FIGS. 10 and 11 is a low-beam light distribution pattern in which the left and right are reversed. The second reflective surface 3 and the cutoff-line forming part 4 become a second reflective surface and a cutoff line forming part which the left and right are reversed.

The above-described embodiments describe the condensing type low-beam light distribution pattern LP among the low-beam light distribution patterns. However, the present invention can be applied to a low-beam light distribution pattern of a normal type and a low-beam light distribution pattern of a diffusion type.

Furthermore, the above-described embodiments include the four light sources 10 and the four incidence parts 2. However, in the present invention, one to three or five or more light sources 10 and incidence parts 2 may be used.

Note that, the present invention is not limited to the embodiments described above.

DESCRIPTION OF REFERENCE NUMERALS 1 lens (vehicle lighting appliance lens)
1U vehicle lighting appliance unit
10 light source
11 light-emitting surface
12 prism part
2 incidence part
20 first reflective surface (reflective surface)
21, 210 first incidence surface
22 second incidence surface
3 second reflective surface (reflective surface)
3C central second reflective region
3L, 30L left second reflective region
3R, 30R right second reflective region
3S condensing second reflective surface (central portion)
3W diffusing second reflective surface (left portion, right portion)
4 cutoff-line forming part
4C corner portion
4D lower cutoff-line forming part
4H horizontal surface
4S oblique cutoff-line forming part
4U upper cutoff-line forming part
4V vertical surface
5 emission surface
5H transverse cross-sectional line of emission surface 5
5V longitudinal cross-sectional line of emission surface 5
100 vehicle lighting appliance device
101 lamp housing
102 lamp lens
103 lamp compartment
B rear
CLD, CLD1, CLD2 lower horizontal cutoff line
CLS, CLS1, CLS2 oblique cutoff line
CLU, CLU1, CLU2 upper horizontal cutoff line D down
F front
HL-HR left and right horizontal lines of screen
L left
L0 light (light from light source)
L1, L10 first incident light
L2 second incident light
L3 first reflected light (reflected light)
L4, L40, L41 second reflected light (reflected light)
L4C central second reflected light
L4D downward second reflected light
L4L left second reflected light
L4R right second reflected light
L4U upward second reflected light
L5 emitted light
LF emission-surface focal point
LP low-beam light distribution pattern (condensing low-beam light distribution pattern)
LP1 low-beam light distribution pattern (low-beam light distribution pattern with wide left and right diffusion widths)
LP2 low-beam light distribution pattern (low-beam light distribution pattern with narrow left and right diffusion widths)
LPθ angle
P paraboloid of revolution
PC central paraboloid of revolution
PL left paraboloid of revolution
PR right paraboloid of revolution
R right
RF reflective-surface focal point
RPθ angle
U up
VPL arbitrary point on transverse cross-sectional line VSH of virtual image plane VS
VPR arbitrary point on transverse cross-sectional line VSH of virtual image plane VS
VS virtual image plane
VSH transverse cross-sectional line of virtual image plane VS
VSV longitudinal cross-sectional line of virtual image plane VS
VU-VD top-bottom vertical line of screen
Z2 incidence-part optical axis
Z3 reflective-surface optical axis
ZC central reflective-surface optical axis
ZL left reflective-surface optical axis
ZR right reflective-surface optical axis
ZV vertical line
ZθC angle
ZθL angle
ZθR angle

The invention claimed is:
1. A vehicle lighting appliance lens comprising:
an incidence part on which at least a portion of light from a light source is incident;
a reflective surface that has a reflective-surface focal point and reflects incident light from the incidence part;
a cutoff-line forming part that is disposed in a left-right direction of a vehicle and forms a cutoff line by controlling a portion of reflected light from the reflective surface; and
an emission surface that emits the reflected light passing through the cutoff-line forming part in front of the vehicle as a light distribution pattern having the cutoff line, wherein,
the reflective-surface focal point is disposed in a vicinity of the cutoff-line forming part, and
the reflective surface has:
a first region in which the reflected light passes through the reflective-surface focal point; and
a second region in which the reflected light reaches a surface position of the vehicle lighting appliance lens, the surface position being away from the cutoff-line forming part toward the reflective surface, and passes right or left side of the reflective-surface focal point.

2. A vehicle lighting appliance unit comprising:
a light source; and
the vehicle lighting appliance lens according to claim 1 that receives light from the light source and emits incident light as a light distribution pattern having a cutoff line along a left-right direction of a vehicle.

3. The vehicle lighting appliance unit according to claim 2, wherein,
the light source comprises a plurality of light sources, and
the vehicle lighting appliance lens includes a plurality of incidence parts corresponding to the plurality of light sources.

4. A vehicle lighting appliance device comprising:
a lamp lens and a lamp housing forming a lamp compartment; and
the vehicle lighting appliance unit according to claim 2 disposed in the lamp compartment.

5. The vehicle lighting appliance lens according to claim 1, wherein,
the reflective surface is based on a paraboloid of revolution and has a reflective-surface optical axis that is a rotation axis of the paraboloid of revolution, and
the reflective-surface optical axis of the first region is parallel to an incidence-part optical axis of the incidence part, and the reflective-surface optical axes of the second region gradually tilts toward a vertical line as the reflective-surface optical axis of the second region shifts to the right or left side from a first region side, an angle formed by the reflective-surface optical axes of the second region and the vertical line being smaller than an angle formed by the incidence-part optical axis and the vertical line.

6. A vehicle lighting appliance lens comprising:
an incidence part that has an incidence-part optical axis tilting relative to a vertical line, and causes at least a portion of light from a light source to be incident as parallel light parallel or substantially parallel to the incidence-part optical axis;
a reflective surface that is based on a paraboloid of revolution, has a reflective-surface optical axis that is a rotation axis of the paraboloid of revolution, has a reflective-surface focal point that is a focal point of the paraboloid of revolution, and reflects incident light from the incidence part;
a cutoff-line forming part that is disposed in a left-right direction of a vehicle and forms a cutoff line along the left-right direction of the vehicle by controlling a portion of reflected light from the reflective surface; and
an emission surface that emits the reflected light passing through the cutoff-line forming part in front of the vehicle as a light distribution pattern having the cutoff line, wherein,
the emission surface has an emission-surface focal point in a vicinity of the reflective-surface focal point, the reflective surface has a central reflective region and outer reflective regions, and the reflective-surface optical axis of the central reflective region is parallel to an incidence-part optical axis, and the reflective-surface optical axes of the second region gradually tilt toward the vertical line as the reflective-surface optical axes of the outer reflective regions shift to an outer side from a central reflective region side, an angle formed by each of the reflective-surface optical axes of the outer reflective regions and the vertical line being smaller than an angle formed by the incidence-part optical axis and the vertical line.

7. The vehicle lighting appliance lens according to claim 6, wherein, the incidence-part optical axis tilts in a state where the direction of the incident light is directed to the emission surface side relative to the vertical line, as the reflective-surface optical axis of a left reflective region of the outer reflective regions shifts to a left side, the reflective-surface optical axis shifts from a state of being parallel or substantially parallel to the incidence-part optical axis to a state of being parallel or substantially parallel to the vertical line, and as the reflective-surface optical axis of a right reflective region of the outer reflective regions shifts to a right side, the reflective-surface optical axis shifts from a state of being parallel or substantially parallel to the incidence-part optical axis to a state of being parallel or substantially parallel to the vertical line.

8. The vehicle lighting appliance lens according to claim 7, wherein, the cutoff-line forming part includes a lower horizontal cutoff-line forming part and an upper horizontal cutoff-line forming part, one of the left reflective region and the right reflective region controls the reflected light passing through the lower horizontal cutoff-line forming part, the other of the left reflective region and the right reflective region controls the reflected light passing through the upper horizontal cutoff-line forming part, and the reflective-surface optical axis of the one of the left reflective region and the right reflective region is parallel or substantially parallel to the vertical line relative to the reflective-surface optical axis of the other of the left reflective region and the right reflective region.

9. A vehicle lighting appliance lens comprising:

an incidence part that has an incidence-part optical axis tilting relative to a vertical line, and causes at least a portion of light from a light source to be incident as parallel light parallel or substantially parallel to the incidence-part optical axis;

a reflective surface that is based on a paraboloid of revolution, has a reflective-surface optical axis that is a rotation axis of the paraboloid of revolution, has a reflective-surface focal point that is a focal point of the paraboloid of revolution, and reflects incident light from the incidence part;

a cutoff-line forming part that is disposed in a left-right direction of a vehicle and forms a cutoff line along the left-right direction of the vehicle by controlling a portion of reflected light from the reflective surface; and an emission surface that emits the reflected light passing through the cutoff-line forming part in front of the vehicle as a light distribution pattern having the cutoff line, wherein, the emission surface has an emission-surface focal point in a vicinity of the reflective-surface focal point, the reflective surface has a central reflective region and outer reflective regions, and the reflective-surface optical axis of the central reflective region tilts toward the vertical line as compared with the reflective-surface optical axes of the outer reflective regions, and wherein, the incidence-part optical axis tilts in a state where the direction of the incident light is directed to the emission surface side relative to the vertical line, as the reflective-surface optical axis of a left reflective region of the outer reflective regions shifts to a left side, the reflective-surface optical axis shifts from a state of being parallel or substantially parallel to the incidence-part optical axis to a state of being parallel or substantially parallel to the vertical line, and as the reflective-surface optical axis of a right reflective region of the outer reflective regions shifts to a right side, the reflective-surface optical axis shifts from a state of being parallel or substantially parallel to the incidence-part optical axis to a state of being parallel or substantially parallel to the vertical line.

\* \* \* \* \*